Figure 1:
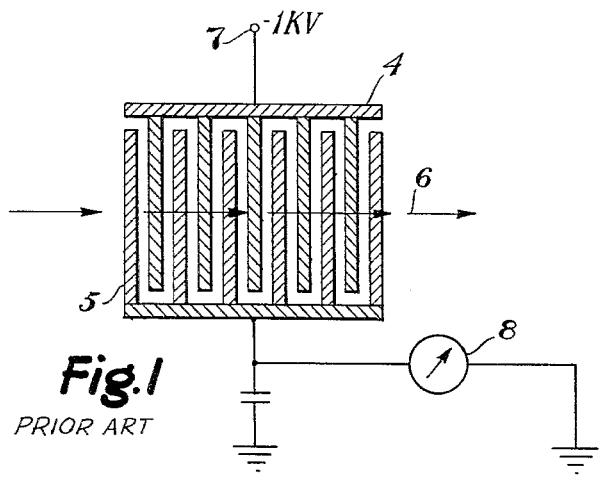

March 8, 1966  S. R. FARRELL  3,239,664
CHARGED PARTICLE BEAM CURRENT MEASURING DEVICE
Filed April 23, 1963

United States Patent Office 3,239,664
Patented Mar. 8, 1966

3,239,664
CHARGED PARTICLE BEAM CURRENT
MEASURING DEVICE
Sherman R. Farrell, Orinda, Calif., assignor, by mesne assignments, to High Voltage Engineering Corporation, Burlington, Mass., a corporation of Massachusetts
Filed Apr. 23, 1963, Ser. No. 275,112
3 Claims. (Cl. 250—49.5)

This invention relates to the measuring and monitoring of high energy charged particle beams such as are developed in linear accelerators, electrostatic generators and the like. More particularly, it comprehends a new and improved beam current measuring device of the so-called secondary emission monitor type.

The measurements of both peak and average beam current is of primary importance in the use of high energy charged particle beams. This is especially true in the fields of physics research and medical therapy where precise monitoring of a charged particle beam is a prerequisite to its successful application. Various methods have been employed to measure the current in a charged particle beam. All such methods have advantages and disadvantages that in general dictate which should be used in any given situation. A comprehensive review of the state of the art is given by Chodorow et al. in an article entitled, Stanford Electron Accelerator Mark III, Review of Scientific Instruments, volume 26 (1955), pp. 199–201, and evaluates such methods as: the use of an electron "catcher", current measurement using an ionization chamber; current measurement from induced radioactivity; current measurement using RF cavities; and current measurement using secondary emitters. A device subsequently developed employing a toroidal coil sensing element is described by L. Bess, J. Ovadin, and J. Valassis in an article entitled, External Beam Current Monitor for Linear Accelerators, Review of Scientific Instruments, volume 30 (1959), pp. 985–988.

One of the most effective of these beam current measuring devices, especially in applications involving high current densities, is the secondary emission monitor. Devices of this type operate on the principle that secondary electron emission from a foil sheet in intercepting relationship with the primary beam is proportional to the beam current. Such devices are independent of primary electron energy and give no evidence of saturation over a wide range of primary beam energies and current densities. However, the problems in shielding and in output line transitions inherent in the particular geometry of these prior art secondary emission monitors, together with the inability to effectively utilize them for selective sampling of the beam current, or for measuring pulsed beams, limit the scope of their application.

Accordingly, it is a principal object of this invention to provide a new and improved charged particle beam current measuring device.

It is another object of this invention to provide a charged particle beam current measuring device of the secondary emission type having a coaxial configuration adapted to obviate shielding and output line transition problems.

It is still another object of this invention to provide a secondary emission monitor for the measurement of the peak and average values of current in a charged particle beam including means for varying the bias voltage therefore whereby the beam current may be sampled during any desired interval and whereby a nonconducting condition may reliably be maintained.

Figure 2:
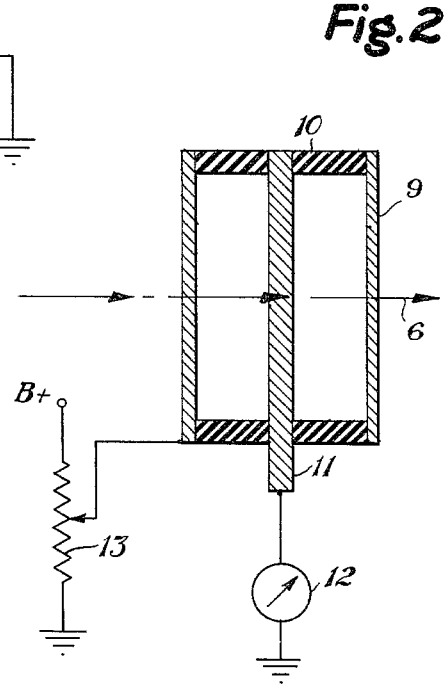
Figure 3:
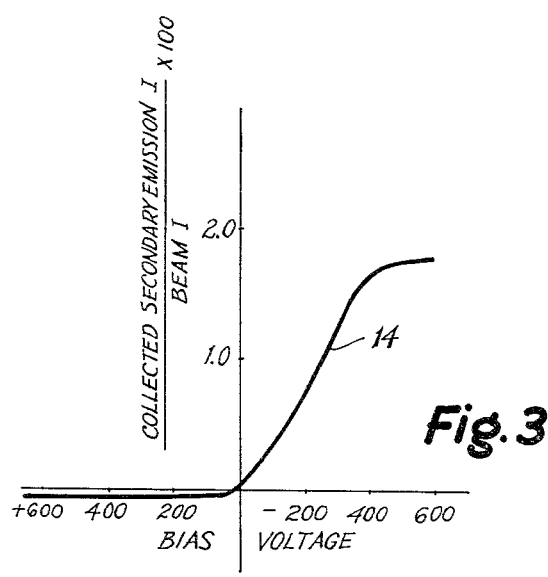

These, together with other objects and features of this invention will be more readily understood from the following detailed description taken in conjunction with the accompanying drawing wherein:

FIGURE 1 is a sectional view of a secondary emission monitor representing the current state of the art;
FIGURE 2 is a sectional view of the secondary emission monitor comprehended by this invention; and,
FIGURE 3 is a graph which plots bias voltage against the collected secondary emission current expressed as a percentage of the primary beam current for the device of FIGURE 2.

The conventional secondary emission monitor is represented by the device of FIGURE 1. In its simplest form it comprises a first group of parallel foil plates 4 (called emitter plates) interleaved with and insulated from a second similar group of parallel foil plates 5 (called collector plates). The foil is of aluminum or similar electron emissive material having density characteristics adapted to permit the passage of a high energy charged particle beam therethrough. This arrangement is placed in intercepting relationship with the charged particle beam 6 to be monitored as illustrated in FIGURE 1 and a negative bias of about −1 kv. is applied to emitter plates 4. Collector plates 5 are grounded through milliammeter 8 or through some other current indicating or recording device. In operation, the charged particle beam 6, in passing through the foil plates, creates a secondary electron emission that is proportional to the current of the beam. The negative bias applied to emitter plates 4 causes the secondary emission to be collected by collector plates 5. The secondary emission current is then measured by current indicating means 8.

The particular geometry of the device of FIGURE 1, however, introduces several limitations to its application. Of particular significance is the flat sheet configuration of the emitter and collector plates. With such an arrangement the collector current is a steep function of the emitter bias at low bias levels and is reversible with change of bias polarity. That is, in the bias voltage range of approximately −400 v. to +400 v. a small increment if bias voltage will cause a large variation in collector current. In addition, since the collector plates have substantially the same area in intercepting relationship with the primary beam as the emitter plates, a positive bias will result in a significant reverse current flow. Because of these characteristics, a zero bias setting is extremely critical, and it is virtually impossible to maintain the device in the non-conducting condition required for making selective measurements or for pulsed operation. Other problems associated with the particular geometry of such prior art devices include making of a transition to a transmission line for viewing beam variations of extremely short durations and shielding the device and the leads from external noise.

The above limitations are effectively obviated by the novel structure hereinafter disclosed. In accordance with the principles of this invention, it is proposed that the collector area be made small with respect to the emitter area, thereby substantially eliminating the problem of current reversal. It is also proposed that the device be made coaxial, with the emitter comprising a thin foil tube surrounding a fine wire collector. The device then essentially becomes one end of a coaxial transmission line in which shielding in intrinsic and the need for a transition to an output lead is eliminated. Such a secondary emission monitor is illustrated in FIGURE 2, reference to which is now made. A cylindrical foil member 9 comprises the emitter member of the monitor and is biased from variable bias supply 13. The cylindrical foil member may be fabricated from aluminum, stainless steel, or any suitable metal that will permit passage of the primary beam 6 therethrough without undue losses. In general, any metal suitable for an electron window would be acceptable. A straight wire collector 11 is positioned coaxially within cylindrical foil member 9 by insulating members 10. The secondary emission current collected by collector 11 is measured by current indicating means 12 which may be a milliammeter, an oscilloscope, or the like, depending upon the application of the monitor.

Referring now to FIGURE 3, there is illustrated a graph which plots bias voltage against collected secondary emission current for one currently preferred embodiment of this invention, the parameters of which are herein given for purposes of illustration. The particular secondary emission monitor from which the curve of FIGURE 3 was obtained comprised a one-half inch diameter stainless steel tube having a 0.001 inch wall in combination with a 0.005 inch diameter copper wire coaxially disposed therein. The monitor was placed in intercepting relationship with a pulsed electron beam having a 200 milliampere peak current and the curve 14 of FIGURE 3 was plotted as the bias voltage was varied from +500 volts to −500 volts. The ordinate values of the graph represent the collected secondary emission current as a percentage of the primary beam current. It has been determined that, in a secondary emission monitor of the type comprehended by this invention, the reverse current is in the order of one hundred times less than the forward current at equal bias levels. For example, the value of the forward current at a bias of −200 volts would be approximately one hundred times that of the reverse current at a bias of +200 volts. It is possible therefore to bias the device to a nonconducting level and to pulse the bias so that the beam current can be sampled during any desired interval. Also, since the reverse current is vanishingly small at low positive bias, it is possible to store the charge on a capacitor connected to the collector and to read out the coresponding voltage at a later time.

It is to be understood that the above described arrangement is illustrative of the principles of this invention. Other arrangements may be devised by those skilled in the art without departing from the spirit and scope of this invention.

What is claimed is:

1. A secondary emission monitor adapted to selectively measure peak and average current in a high energy charged particle beam comprising a collector member, an emitter member of electron emissive material having density characteristics adapted to permit the passage of a high energy charged particle beam therethrough insulated from and enclosing said collector member, said emitter member having a surface area that is large with respect to the surface area of said collector member, means for applying a bias voltage to said emitter member, and means for measuring current flowing in said collector member.

2. Apparatus as defined in claim 1 wherein said emitter member comprises a cylindrical metal foil and said collector member comprises a fine straight metallic wire coaxially disposed within said emitter member.

3. Apparatus as defined in claim 2 wherein said collector member is fabricated of copper and said emitter member is fabricated of stainless steel.

References Cited by the Examiner
UNITED STATES PATENTS

| | | | |
|---|---|---|---|
| 3,028,517 | 4/1962 | Ryan | 313—93 X |
| 3,098,944 | 7/1963 | Fox | 313—93 |

RALPH G. NILSON, *Primary Examiner.*

ARCHIE BORCHELT, *Examiner.*